July 14, 1953     T. E. McDOWELL     2,645,766

RAILWAY WARNING LIGHT CONTROL SYSTEM

Filed Dec. 31, 1948

Inventor
THOMAS E. McDOWELL
by
Attys.

Patented July 14, 1953

2,645,766

UNITED STATES PATENT OFFICE 2,645,766

RAILWAY WARNING LIGHT CONTROL SYSTEM

Thomas E. McDowell, Chicago, Ill., assignor to The Pyle-National Company, Chicago, Ill., a corporation of New Jersey Application December 31, 1948, Serial No. 68,599

4 Claims. (Cl. 340—262)

This invention relates to a control system for a railway warning light, and more particularly, relates to an inertia type control system for an electric circuit which is completely automatic in operation.

Although the present invention may be understood to be of general utility, it is particularly applicable in the control of electric circuits embodied in vehicular apparatus, for example, the control of a railway warning light control system.

There is a particular need in the railroad industry today for the provision of adequate safety devices to safeguard the high-speed operation of streamline and other trains running on shortened schedules. Accordingly, the last car of a train is sometimes provided with especially designed warning lights which can be operated in such a manner as to project a gyrating beam of light whenever the train slows down below a predetermined minimum speed or comes to a stop. Thus, the engineer of a train proceeding on the same track behind the first train will be warned as soon as the second train comes within the range of the warning light.

Heretofore, warning lights having the aforementioned characteristics have been controlled in various ways. For example, control systems for the warning light circuits have been produced which energize a circuit in response to variations in air pressure in the conduits of the air brake system. In the very early systems of this type, the light would go off when the air brake pressure was restored, even though the train was still at rest. Later, systems which operated as a function of a reduction of air brake pressure could only turn off the light by a manual resetting operation. This latter type of system thus required the attendance of an operator and, of course, was also subject to the fallibility of human error.

It is an object of this invention to provide an improved control system for a warning light control circuit which is completely automatic in operation and which overcomes the disadvantages of the prior systems.

It is a further object of this invention to provide an inertia type control system responsive to relative changes in velocity of the vehicle for controlling an electric circuit containing a warning light or other device to be controlled.

It is an object of this invention to provide an inertia type switch responsive to changes in velocity of a vehicle to energize relays and a suitable circuit means associated therewith.

It is a further object of this invention to provide a mercury type inertia switch responsive to changes in velocity of the vehicle to energize a relay and circuit means associated therewith in control of a warning light.

Another object of this invention is to provide a novel method of controlling a warning light circuit of the type which is automatically energized by a pressure sensitive control device.

Many other objects will become apparent to those skilled in the art upon reference to following detailed description and the accompanying drawing.

It is believed that my novel method will be understood from the description of the apparatus herein provided for practicing the same. For a more complete understanding of the present invention, reference may be had to the following detailed description of the accompanying drawings in which.

As shown on the drawing.

Figure 2:
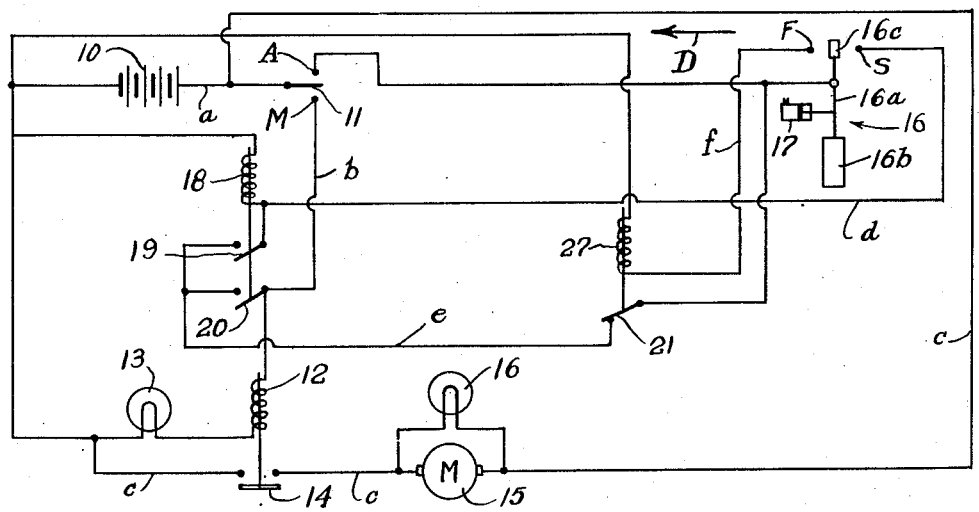
Figure 2 is a wiring diagram illustrating the principles of my invention as they are applied, by way of example, to a typical installation in a railroad train warning light control system.

Referring specifically to Figure 2, an electric circuit is shown which may be energized by a source of power supply indicated generally at 10. A three-position selector switch 11 is interposed in a conductor $a$ leading from the source 10. In the middle position, the switch 11 is "off"; when turned to the position "A," the circuit is on "automatic" operation; and, when turned to the position "M," the circuit is on "manual" operation.

By turning the switch 11 to the position "M," current is caused to flow from the source 10 through lead $a$ through the switch 11 and into a lead $b$. A series relay 12 connected in the lead $b$ is thereby energized and operates to energize the bulb 13. At the same time, the series relay 12 operates to actuate a switch 14 situated in a lead $c$ returning to source 10, thereby completing the circuit of manual operation and energizing a motor 15 and a pilot light 16 associated with the motor 15. The motor 15 is connected to a suitable oscillating means provided to cooperate with the bulb 13, thereby causing the beam of projected light to gyrate or oscillate in a desired manner.

By turning the selector switch 11 to the automatic position "A," control of the electric circuit reposes in an inertia type switch indicated generally at 16.

As shown in Figure 2, the inertia type switch 16 comprises a pivoted pendulum arm 16a having affixed on opposite ends thereof a mass 16b and a contact point 16c. The switch 16 is further provided with a suitable dash pot 17 which operates to stabilize the operation of the switch.

Assuming that the direction of the vehicular motion is in the direction of the arrow "D," it will be evident that when a vehicle is in motion and tends to reduce its velocity, or decelerate, the mass 16b on the pendulum arm 16a will respond in accordance with well known phenomenon of inertia and will tend to move forward, thereby causing the contact point 16c to close contact in the position indicated by the reference character "S."

Situated in the circuit designated by the character d and leading from the switch 16 is a relay 18 which is energized when the switch 16 is moved to the "S" position. The relay 18 closes a contact switch 19, thereby completing a holding circuit designated e and keeping the relay 18 energized. At the same time, the relay 18 closes a contact switch 20 which operates to energize the series relay 12. The series relay 12, in turn, operates to energize the bulb 13 and actuates the switch 14 to energize the motor 15 and the pilot light 16.

When the vehicle finally comes to rest, the pendulum arm 16a will again be restored to its "mid" position, however, the relay 18 will continue to be energized through the switch 19 and the lead e containing a normally closed switch 21 which completes the automatic holding circuit.

When the vehicle again moves forward, the mass 16b will tend to remain at rest, therefore, the relative inertia phenomenon will cause the contact point 16c of the pendulum arm 16a to move to the "F" position.

Situated in a circuit identified by the lead f and associated with the switch 16 is a relay 27 which is energized when the switch 16 is in the "F" position. The relay 27 actuates the switch 21 to the open position, thereby breaking the holding circuit and de-energizing the relay 18. When the relay 18 is de-energized, the switch 20 is opened, thereby causing the series coil relay 12 to be de-energized which, in turn, causes the bulb 13 to be de-energized and actuates the switch 14 to an open position, thereby de-energizing the motor 15 and the pilot light 16.

It should be noted that the dash pot 17 affects the switch 16 in such a manner as to impart thereto a time factor which effectively eliminates accidental operation of the control system because of momentary decelerations or accelerations occurring as a result of jerky motion characteristics of the vehicle.

Figure 1:
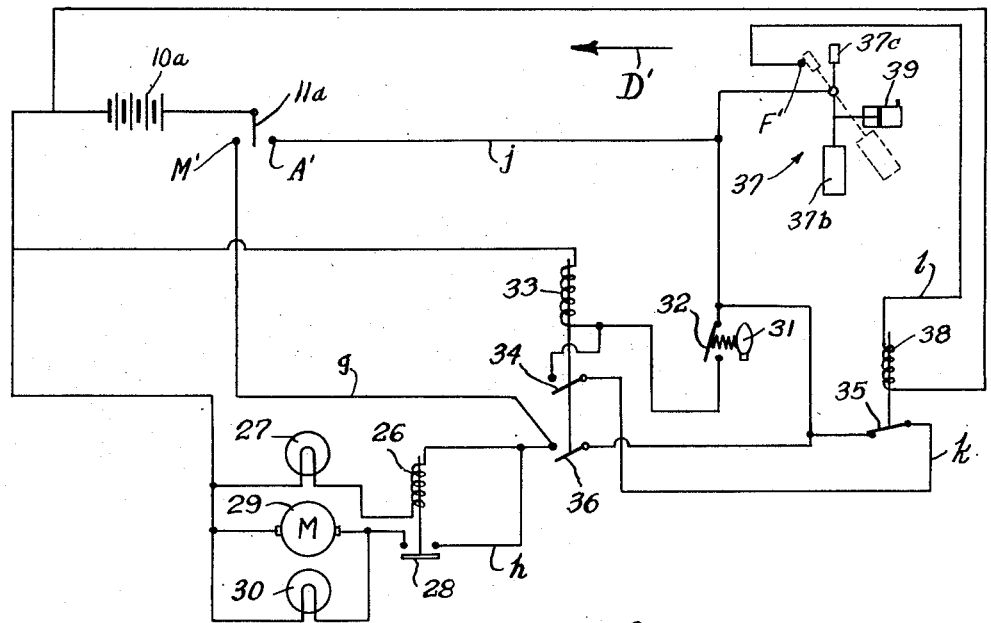
Figure 1 is a wiring diagram showing how my invention may be modified and adapted for installation in a so-called air-inertia type control system.

Referring now to Figure 1, an electric circuit is shown which may be energized by a suitable source of power supply indicated generally at 10a. A three-position selector switch 11a may be selectively actuated to the manual position indicated by the reference character "M'" or the automatic position indicated by the reference character "A'."

By turning the switch 11a to the manual position "M'," current is caused to flow from the source 10a through a lead g to a series relay 26 and a bulb 27. At the same time, the series relay 26 operates to actuate a switch 28 to a closed position, thereby closing a lead h and completing the circuit of manual operation. When the switch 28 is closed, a motor 29 and a pilot light 30 associated therewith will also be energized. The motor 29 is associated with suitable oscillating means provided to cooperate with the bulb 27, thereby causing a beam of projected light emanating from the bulb to oscillate or gyrate in a desired manner.

When the switch 11a is in the automatic position "A'," a pressure-responsive switch 31 located in that part of the circuit identified by the reference character j actuates a contact switch 32 upon a predetermined pressure change in the conduits of the air brake system. When the contact switch 32 is closed, a relay 33 is energized and causes a contact switch 34 to be closed. It will be evident that when the switch 34 is closed, the circuit to the relay 33 will be completed by the normally closed switch 35 interposed in the holding circuit identified by the character k. At the same time, the relay 33 operates to close a switch 36 thereby closing the circuit to the series coil relay 26, and the bulb 27. The series relay 26, in turn, will actuate the switch 28 to a closed position, thereby energizing the motor 29 and the pilot light 30. It will be evident that even if pressure in the brake system is restored to normal, actuation of the switch 32 will not operate to break the circuit, therefore, the entire circuit will stay energized unless turned off by the selector switch 11a or in the manner presently to be described.

When the pressure in the pressure switch 31 is brought to normal, the contact switch 32 will be actuated to an open position, thereby reposing further control of the automatic electric control circuit in an inertia type switch generally indicated by the reference numeral 37.

As shown on Figure 1, the switch 37 comprises a pivoted pendulum arm 37a having affixed on opposite ends thereof a mass 37b responsive to changes in velocity of a vehicle, and a contact point 37c. If the vehicle moves forward, in the direction of vehicular motion indicated by the arrow designated "D'," the inertia force of the mass 37b will cause the pendulum arm to swing through an arc and the contact point 37c will move to the position indicated at "F'." It will be noted that when this contact is made, a relay 38 electrically connected by the lead l will be energized. The relay 38 operates to actuate the switch 35 to an open position, thereby breaking the holding circuit.

When the holding circuit is broken, the series relay 33 will be de-energized, the switches 34 and 36 will be opened, the series coil relay 26 will be deenergized, the switch 28 will be opened, and the bulb 27, the motor 29, and the pilot light 30 will be deenergized. Thus, the entire electric circuit has been restored to normal and will be ready for the next operation.

It will be noted that the pendulum type switch 37 is provided with a dash pot 39 which operates in a conventional manner to stabilize the oscillatory movement of the pendulum arm 37a at all times during the operational sequence.

Figure 3:
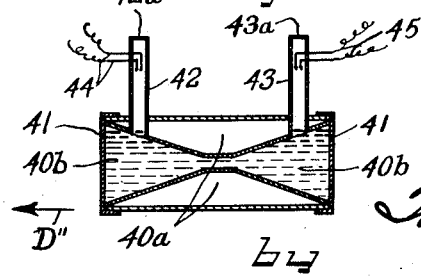
Figure 3 is an elevational view of a mercury type inertia switch according to the present invention.

Referring now to Figure 3, a mercury type inertia switch is shown generally at 40. The switch 40 comprises a body 40a which is shaped to define a pair of internal cone-shaped cavities which are joined to one another at a point corresponding to the apex of each respective cone. The body 40a of the switch 40 may be suitably sealed on both ends by means of end plates 41.

The switch 40 is further provided with a pair of upstanding tube members 42 and 43. The tubes 42 and 43 are mounted in longitudinally spaced alignment upon the body 40a of the switch 40 and are adapted to be in communication with the cone-shaped cavities 40b in proximity to a point corresponding to the base of the cone. The upper ends of the tubes 42 and 43 are preferably in communication with the atmosphere through a bleeder hole indicated at 42a and 43a, respectively. A pair of electric conductors 44 and 45 are fixed within the tubes 42 and 43, respectively, in such a manner as to lie in predetermined vertically spaced relationship above the cone-shaped cavity 40b. The cone-shaped cavities 40b are completely filled with mercury or the like. Thus, if the switch 40 is in control of an electric circuit on a vehicle normally moving in the direction of the arrow "D," deceleration of the vehicle will cause the mercury in the cone-shaped cavity 40b to tend toward the left and rise in the tube 42, thereby operating to complete the electric circuit connected to the conductors 44. If the vehicle is subjected to an acceleration, the mercury tends to the right and rises in the tube 43, thereby completing the electric circuit connected to the conductors 45.

It will be apparent to those skilled in the art that I have described novel and improved apparatus for controlling the operation of vehicular warning lights and a novel method of control practiced thereby. It will be further apparent that various details of the present invention can be subjected to modification without departing from the spirit thereof. Therefore, it should be understood that the embodiment herein disclosed is not to be construed as a limitation, inasmuch as I desire to be limited only by the scope of the appended claims and the prior art.

I claim as my invention:

1. Apparatus for controlling the operation of vehicular warning devices comprising, in combination, an inertia switch responsive to acceleration and deceleration of a vehicle, a first circuit associated therewith, relay means in said first circuit, a holding circuit, a first switch means in said holding circuit actuatable by said relay means to complete said holding circuit for said relay means, a second circuit, a second switch means in said second circuit actuatable by said relay means to complete said second circuit, a series relay in said second circuit, said series relay operable to energize a third switch means, a third circuit controlled by said third switch means, a device to be controlled in said third circuit, a fourth circuit associated with said inertia switch, a relay in said fourth circuit, a fourth switch means in said holding circuit actuatable by said relay whereby said device may be energized upon deceleration of said vehicle and held energized until said acceleration of said vehicle occurs.

2. In combination with a vehicle carried electric warning signal, an energization circuit means for energizing the electric warning signal, a first control switch means in control of said energization circuit means, holding circuit means for maintaining said energization circuit means closed even when said control switch means is inactivated, a second control switch means in control of said holding circuit means for opening said energization circuit means and conditioning said apparatus for energizing the electric warning signal again by said first control switch means, and an acceleration responsive actuating means operatively controlling said second control switch means for operating said second control switch means to deenergize the electric warning signal in response to acceleration of the vehicle.

3. In combination with a vehicle carried electric warning signal, an energization circuit means for energizing the electric warning signal, a first control switch means in control of said energization circuit means, holding circuit means for maintaining said energization circuit means closed even when said control switch means is inactivated, a second control switch means in control of said holding circuit means for opening said energization circuit means and conditioning said apparatus for energizing the electric warning signal again by said first control switch means, and an acceleration responsive actuating means operatively controlling said second control switch means for operating said second control switch means to deenergize the electric warning signal in response to acceleration of the vehicle, said first control switch means comprising pressure responsive switch means adapted to be connected in the air brake line of the vehicle to energize the electric warning signal whenever a pressure change occurs due to at least a partial application of the vehicle brakes.

4. In combination with a vehicle carried electric warning signal, an energization circuit means for energizing the electric warning signal, a first control switch means in control of said energization circuit means, holding circuit means for maintaining said energization circuit means closed even when said control switch means is inactivated, a second control switch means in control of said holding circuit means for opening said energization circuit means and conditioning said apparatus for energizing the electric warning signal again by said first control switch means, and an acceleration responsive actuating means operatively controlling said second control switch means for operating said second control switch means to deenergize the electric warning signal in response to acceleration of the vehicle, said first control switch means comprising acceleration responsive switch means carried by the vehicle to energize the electric warning signal whenever the vehicle decelerates.

THOMAS E. McDOWELL.

References Cited in the file of this patent

UNITED STATES PATENTS

| Number | Name | Date |
|---|---|---|
| 2,019,410 | Hallman | Oct. 29, 1935 |
| 2,100,105 | Lee et al. | Nov. 23, 1937 |
| 2,216,364 | Dezzani | Oct. 1, 1940 |
| 2,304,561 | Gerisch | Dec. 8, 1942 |
| 2,305,414 | Gerisch | Dec. 15, 1942 |
| 2,316,584 | Horton | Apr. 13, 1943 |
| 2,317,028 | Chappell et al. | Apr. 20, 1943 |
| 2,408,711 | Volz | Oct. 1, 1946 |
| 2,432,388 | Curtiss | Dec. 9, 1947 |
| 2,439,474 | Kennelly | Apr. 13, 1948 |
| 2,445,873 | Chambers | July 27, 1948 |
| 2,456,286 | Kennelly | Dec. 14, 1948 |
| 2,474,610 | Wunsch | June 28, 1949 |
| 2,535,384 | Batt | Dec. 26, 1950 |